(12) United States Patent
Calhoun

(10) Patent No.: US 7,342,906 B1
(45) Date of Patent: Mar. 11, 2008

(54) DISTRIBUTED WIRELESS NETWORK SECURITY SYSTEM

(75) Inventor: Patrice R. Calhoun, Pleasanton, CA (US)

(73) Assignee: Airespace, Inc., San Jose, CA (US)

(*) Notice: Subject to any disclaimer, the term of this patent is extended or adjusted under 35 U.S.C. 154(b) by 1076 days.

(21) Appl. No.: 10/407,346

(22) Filed: Apr. 4, 2003

(51) Int. Cl.
*H04Q 7/24* (2006.01)

(52) U.S. Cl. ............ 370/338; 370/310; 370/315; 713/168; 713/156; 713/171; 713/186; 709/229; 455/410; 455/450; 455/452.1

(58) Field of Classification Search ........... 370/310, 370/338, 315, 316; 709/229; 713/168, 156, 713/186; 455/410–411
See application file for complete search history.

(56) References Cited

U.S. PATENT DOCUMENTS

| | | | |
|---|---|---|---|
| 5,564,079 A | | 10/1996 | Olsson |
| 5,684,860 A | * | 11/1997 | Milani et al. ............ 455/412.1 |
| 6,112,095 A | | 8/2000 | Wax et al. |
| 6,115,605 A | | 9/2000 | Siccardo et al. |
| 6,134,448 A | | 10/2000 | Shoji et al. |
| 6,140,964 A | | 10/2000 | Sugiura et al. |
| 6,198,935 B1 | | 3/2001 | Saha et al. |
| 6,212,391 B1 | | 4/2001 | Saleh et al. |
| 6,249,252 B1 | | 6/2001 | Dupray |
| 6,259,406 B1 | | 7/2001 | Sugiura et al. |
| 6,269,246 B1 | | 7/2001 | Rao et al. |
| 6,275,190 B1 | | 8/2001 | Sugiura et al. |
| 6,282,427 B1 | | 8/2001 | Larsson et al. |
| 6,304,218 B1 | | 10/2001 | Sugiura et al. |
| 6,414,634 B1 | | 7/2002 | Tekinay |
| 6,415,155 B1 | | 7/2002 | Koshima et al. |
| 6,441,777 B1 | | 8/2002 | McDonald |
| 6,456,892 B1 | | 9/2002 | Dara-Abrams et al. |
| 6,526,283 B1 | | 2/2003 | Jang |

(Continued)

FOREIGN PATENT DOCUMENTS

EP 0 930 514 A2 7/1999

(Continued)

OTHER PUBLICATIONS

Chirumamilla, Mohan K. and Ramamurthy, Byrav. "Agent Based Intrusion Detection and Response System for Wireless LANs." IEEE Int'l Conference on Communications, 2003, vol. 1, pp. 492-496.

(Continued)

*Primary Examiner*—Marceau Milord
(74) *Attorney, Agent, or Firm*—Mark J. Spolyar

(57) ABSTRACT

Methods, apparatuses and systems enabling a distributed wireless network security system. In one embodiment, the present invention provides a wireless network system where security policies are automatically distributed and uniformly implemented across wireless network access points. Embodiments of the present invention address the situation where a malicious user moves to a different access point within a wireless network environment after failing to properly authenticate and/or associate at a first access point. Embodiments of the present invention enable an integrated, multi-layer network security system, wherein a security mechanism at one layer (e.g., link layer security mechanisms) can set policies based on information gleaned from operation of a security mechanism at another layer (e.g., application layer authentication servers).

39 Claims, 4 Drawing Sheets

U.S. PATENT DOCUMENTS

| | | | |
|---|---|---|---|
| 6,556,942 B1 | 4/2003 | Smith | |
| 6,760,318 B1 | 7/2004 | Bims | |
| 6,788,658 B1 | 9/2004 | Bims | |
| 6,925,070 B2 | 8/2005 | Proctor, Jr. | |
| 6,940,827 B2 * | 9/2005 | Li et al. | 370/278 |
| 6,963,740 B1 * | 11/2005 | Guthery et al. | 455/410 |
| 6,978,023 B2 * | 12/2005 | Dacosta | 380/258 |
| 7,028,097 B2 * | 4/2006 | Bard | 709/232 |
| 7,028,183 B2 * | 4/2006 | Simon et al. | 713/168 |
| 7,032,241 B1 * | 4/2006 | Venkatachary et al. | 726/4 |
| 7,050,480 B2 * | 5/2006 | Ertel et al. | 375/141 |
| 7,068,999 B2 * | 6/2006 | Ballai | 455/411 |
| 7,072,315 B1 * | 7/2006 | Liu et al. | 370/329 |
| 7,073,066 B1 * | 7/2006 | Nessett | 713/181 |
| 7,103,026 B2 * | 9/2006 | Hall et al. | 370/335 |
| 7,124,197 B2 * | 10/2006 | Ocepek et al. | 709/232 |
| 7,133,842 B2 * | 11/2006 | Harif | 705/37 |
| 7,146,172 B2 * | 12/2006 | Li et al. | 455/452.1 |
| 7,149,896 B1 * | 12/2006 | Bahl et al. | 713/166 |
| 7,164,669 B2 * | 1/2007 | Li et al. | 370/336 |
| 7,177,298 B2 * | 2/2007 | Chillariga et al. | 370/348 |
| 7,212,837 B1 | 5/2007 | Calhoun et al. | |
| 2002/0174335 A1 | 11/2002 | Zhang et al. | |
| 2002/0188723 A1 | 12/2002 | Choi | |
| 2003/0023746 A1 | 1/2003 | Loguinov | |
| 2003/0117985 A1 | 6/2003 | Fujii et al. | |
| 2003/0135762 A1 | 7/2003 | Macaulay | |
| 2003/0188006 A1 | 10/2003 | Bard | |
| 2003/0198208 A1 | 10/2003 | Koos, Jr. et al. | |

FOREIGN PATENT DOCUMENTS

| | | |
|---|---|---|
| EP | 0 967 816 A1 | 12/1999 |
| EP | 1 018 457 A1 | 7/2000 |
| EP | 1 296 531 A1 | 3/2003 |
| EP | 1 301 055 A1 | 4/2003 |
| JP | 02044929 | 2/1990 |
| WO | WO 98/41048 | 12/1998 |
| WO | WO 99/08909 | 7/2000 |
| WO | WO 97/33386 | 10/2000 |
| WO | WO 02/43425 A1 | 5/2002 |
| WO | WO 02/054813 A1 | 7/2002 |
| WO | WO 03/023443 A2 | 3/2003 |

OTHER PUBLICATIONS

"IBM Research Demonstrates Industry's First Auditing Tool for Wireless Network Security," Jul. 12, 2001, Hawthorne, N.Y. IBM Research News, 'Online. URL: http://domino.research.ibm.com/comm/pr.nsf/pages/news.20010712_wireless.html.

"IBM Researchers Demonstrate Industry's First Self-Diagnostic Wireless Security Monitoring Tool." Jun. 21, 2002, Hawthorne, N.Y. IBM Nieuws, 'Online URL: http://domino.research.ibm.com/comm/pr.nsf/pages/news.20020617_dwsa.html.

"Ekahau Logical Areas-location enabling the Wi-Fi network." Apr. 4, 2003. Ekahau, Inc., Saratoga, CA. Company's URL: www.ekahau.com.

"Ekahau Positioning Engine 2.0: Product Overview." Apr. 4, 2003, Ekahau. Inc., Saratoga, CA. URL: http://www.ekahau.com/products/positioningengine/.

"Ekahau Positioning Engine 2.0: Data sheet," Apr. 4, 2003. Ekahau, Inc., Saratoga, CA. URL: http://www.ekahau.com/pdf/EPE_2.0_datasheet.PDF.

"Indoor Positioning in 802.11b Networks." Apr. 4, 2003. Ekahau, Inc., Saratoga, CA. URL: http://www.ekahau.com/products/positioningengine/features.html.

"InFielder." Apr. 22, 2003. Wireless Valley, Austin, TX. URL: http://www.wirelessvalley.com/Products/InFielder/InFielder.asp.

"LANFielder." Apr. 22, 2003. Wireless Valley, Austin, TX. URL: http://www.wirelessvalley.com/Products/LANFielder/LANFielder.asp.

"Optimatic." Apr. 22, 2003. Wireless Valley, Austin, TX. URL: http://www.wirelessvalley.com/Products/Optimatic/Optimatic.asp.

"Predictor." Apr. 22, 2003. Wireless Valley, Austin, TX. URL: http://www.wirelessvalley.com/Products/Predictor/Predictor.asp.

"LANFielder Product Literature." Feb. 10, 2004. Wireless Valley, Austin, TX. URL: http://www.wirelessvalley.com/Assets/brochures/LanFielder.pdf.

Conley, C., "Securing WLANS with Location-Enabled Networks." Wireless Security Perspectives, vol. 5,No. 3, Mar. 2003. Organization's URL: www.cnp-wireless.com/wsp.html.

"Company Information." Apr. 6, 2004. Corsair Communications:A LightBridge Company, Burlington, MA. Company's URL: www.lightbridge.com.

"Corporate Fact Sheet." Aruba.Wireless Networks, San Jose, CA. Feb. 10, 2004. URL: http://www.arubanetworks.com/pdf/corporate_fact_sheet.pdf.

"Airwave Rogue Access Point Detection," 2002. Airwave Wireless, Inc. San Mateo, CA. URL: http://airwave.com/features.html.

Geier, J. "Identifying Rogue Access Points." Jan. 6, 2003. Wi-Fi Planet Tutorials. URL: http://www.wi-fiplanet.com/tutorials/article.php/1564431.

Brewin, B. "IBM Develops Tool to Detect Rogue Wireless LAN Access Points." Jun. 17, 2002. Computerworld, Framingham, MA. URL: http://www.computerworld.com/mobiletopics/mobile/story/0,10801,72065,00.html.

Bulusu, N., Heidemann, J., Estrin, D. "GPS-less Low Cost Outdoor Localization for Very Small Devices." *IEEE Personal Communications*, Oct. 2000. URL: http://lecs.cs.ucla.edu/~bulusu/papers/Bulusu00a.pdf.

"Assessing Wireless Security with AiroPeek and AiroPeek NX." A WildPackets Academy Tutorial from www.wildpackets.com, WildPackets Inc., Walnut Creek, CA. Jan. 16, 2003. URL: http://www.wildpackets.com/elements/whitepapers/AiroPeek_Security.pdf.

"AiroPeek and Wireless Security: Identifying and Locating Rogue Access Points." A WildPackets Academy Tutorial from www.wildpackets.com, WildPackets Inc., Walnut Creek, CA. Jan. 16, 2003. URL: http://www.wildpackets.com/elements/whitepapers/RogueAccessPoints.pdf.

Craiger, J. P., "802.11, 802.1x, and Wireless Security," Jun. 23, 2002. From the SANS' Information Security Reading Room on www.sans.org, The SANS Institute, Bethesda, MD. URL: http://www.sans.org/rr/papers/68/171.pdf.

Baily, S. "Is IEEE 802.1X Ready for General Development?" Apr. 7, 2002. From the SANS' Information Security Reading Room on www.sans.org, The SANS Institute, Bethesda, MD. URL: http://www.sans.org/rr/papers/9/709.pdf.

International Standard, ISO/IEC 8802-11 ANSI/IEEE Std. 802.11, 1999 Edition, Part II: Wireless LAN Medium Access Control (MAC) and Physical Layer (PHY) specifications, pp. 122-137.

"tcp-masq" Internet citation http://speed.cis.nctu.edu.tw/bandwith/opensource/, Daa Sheet Cisco Aironet 1200 Series Access Point, pp. 1-13, posted Mar. 11, 2002.

* cited by examiner

Fig._1

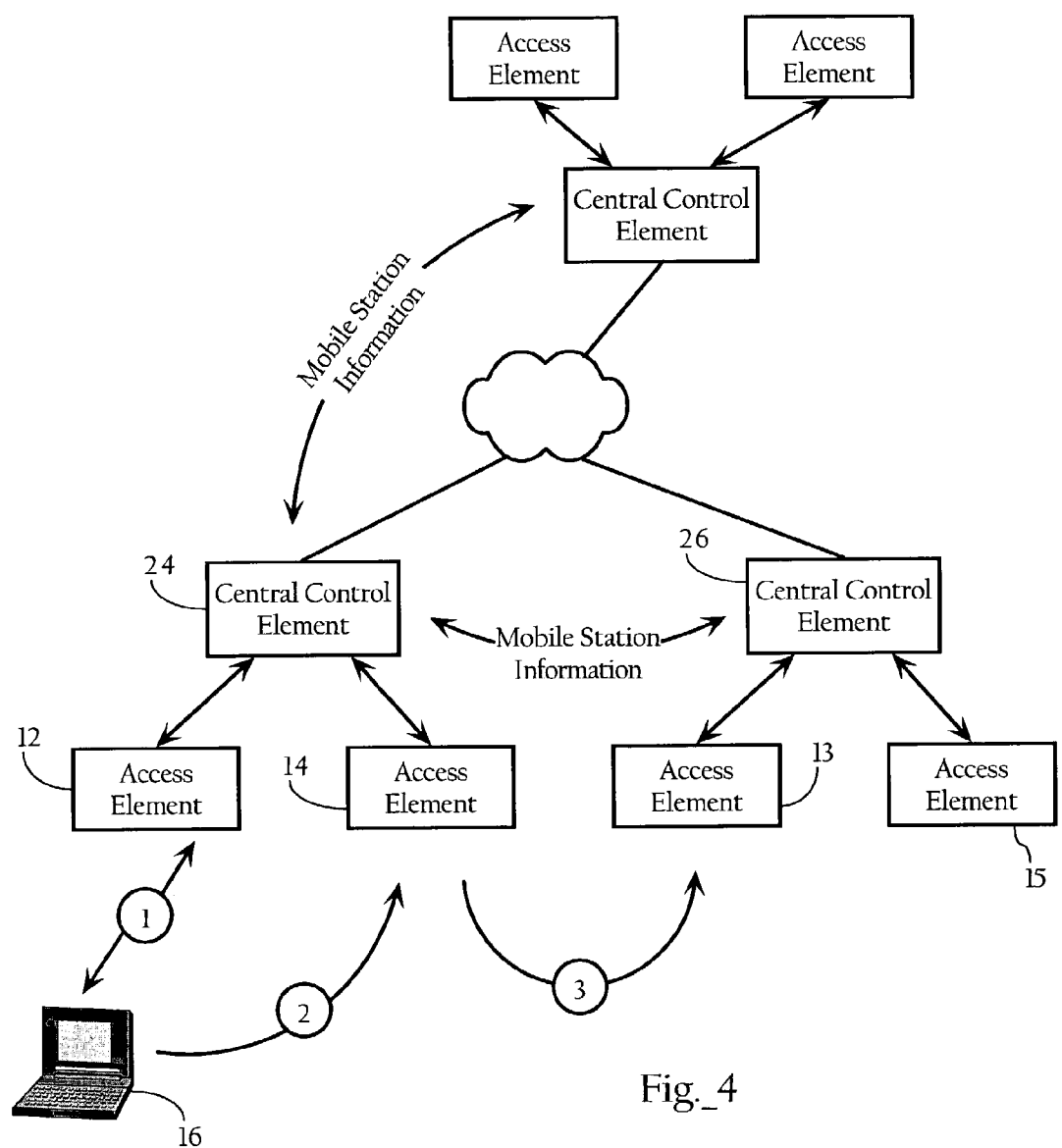
Fig._4

DISTRIBUTED WIRELESS NETWORK SECURITY SYSTEM

CROSS-REFERENCE TO RELATED APPLICATIONS

This application makes reference to the following commonly owned U.S. patent applications and/or patents, which are incorporated herein by reference in their entirety for all purposes:

U.S. patent application Ser. No. 10/155,938 in the name of Patrice R. Calhoun, Robert B. O'Hara, Jr. and Robert J. Friday, entitled "Method and System for Hierarchical Processing of Protocol Information in a Wireless LAN."

FIELD OF THE INVENTION

The present invention relates to wireless computer networks and, more particularly, to methods, apparatuses and systems effecting a distributed security mechanism for wireless computer network environments.

BACKGROUND OF THE INVENTION

The market adoption of wireless LAN (WLAN) technology has exploded, as users from a wide range of backgrounds and vertical industries brought this technology into their homes, offices, and increasingly into the public air space. This inflection point highlighted not only the limitations of earlier-generation systems, but the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

As enterprises and other entities increasingly rely on wireless networks, security of wireless network environments becomes a critical component to ensure the integrity of the enterprise's network environment against unauthorized access. Indeed, wireless networks pose security risks not encountered in wired computer network, since any wireless client in the coverage area of an access point can potentially gain access to the network without a physical connection. In an 802.11 wireless network, prior art security mechanisms are implemented in a variety of manners. For example, the 802.11 protocol provides for shared-key authentication according to which a wireless client must possess a shared secret key in order to establish a wireless connection with an access point. In addition, as with wired networks, the wireless network infrastructure can operate in connection with application level security mechanisms, such as a RADIUS or other authentication server, to control access to network resources.

To establish a wireless connection with an access point, a wireless client or station (STA) transmits probe requests to discover the access point(s) within range. After selecting an access point, the wireless client transmits an authentication request to the selected access point. With open system authentication, the access point responds to the request, either accepting or rejecting the request. With shared-key authentication, the access point transmits a challenge response. To authenticate, the wireless must send an encrypted version of the challenge response (using a shared key) in an authentication frame back to the access point.

As one skilled in the art recognizes, each time an access point interacts with a wireless client associated with a malicious, unauthorized user, there is a risk that the malicious user can gain access to the network environment. After failing to connect at a first access point, a malicious or unauthorized user may simply move to another access point and attempt to establish a wireless connection. In prior art wireless network environments, however, there exists no mechanism for coordinating or distributing security policy across access points. Accordingly, the knowledge gleaned from interaction with a given wireless client at the first access point essentially goes unused when the user moves to a different coverage area and new access point, exposing the network to a new round of attacks.

In light of the foregoing, a need in the art exists for methods, apparatuses and systems that facilitate the distribution of security information across access points associated with a wireless network environment. A need further exists for methods, apparatuses, and systems that allow for the sharing of security information across access points to effect a unitary security scheme throughout a wireless network environment. Embodiments of the present invention substantially fulfill these needs.

SUMMARY OF THE INVENTION

The present invention provides methods, apparatuses and systems enabling a distributed wireless network security system. In one embodiment, the present invention provides a wireless network system where security policies are automatically distributed and uniformly implemented across wireless network access points. Embodiments of the present invention address the situation where a malicious user moves to a different access point within a wireless network environment after failing to properly authenticate and/or associate at a first access point. Embodiments of the present invention enable an integrated, multi-layer network security system, wherein a security mechanism at one layer (e.g., link layer security mechanisms) can set policies based on information gleaned from operation of a security mechanism at another layer (e.g., application layer authentication servers).

DESCRIPTION OF THE DRAWINGS

FIG. 4 is a functional block diagram illustrating operation of the security mechanism across a wireless network deployment according to an embodiment of the present invention.

DESCRIPTION OF PREFERRED EMBODIMENT(S)

For didactic purposes an embodiment of the present invention is described as operating in a WLAN environment as disclosed in U.S. application Ser. No. 10/155,938 incorporated by reference herein. As discussed below, however, the present invention can be implemented according to a vast array of embodiments, and can be applied to a variety of WLAN architectures.

Figure 1:
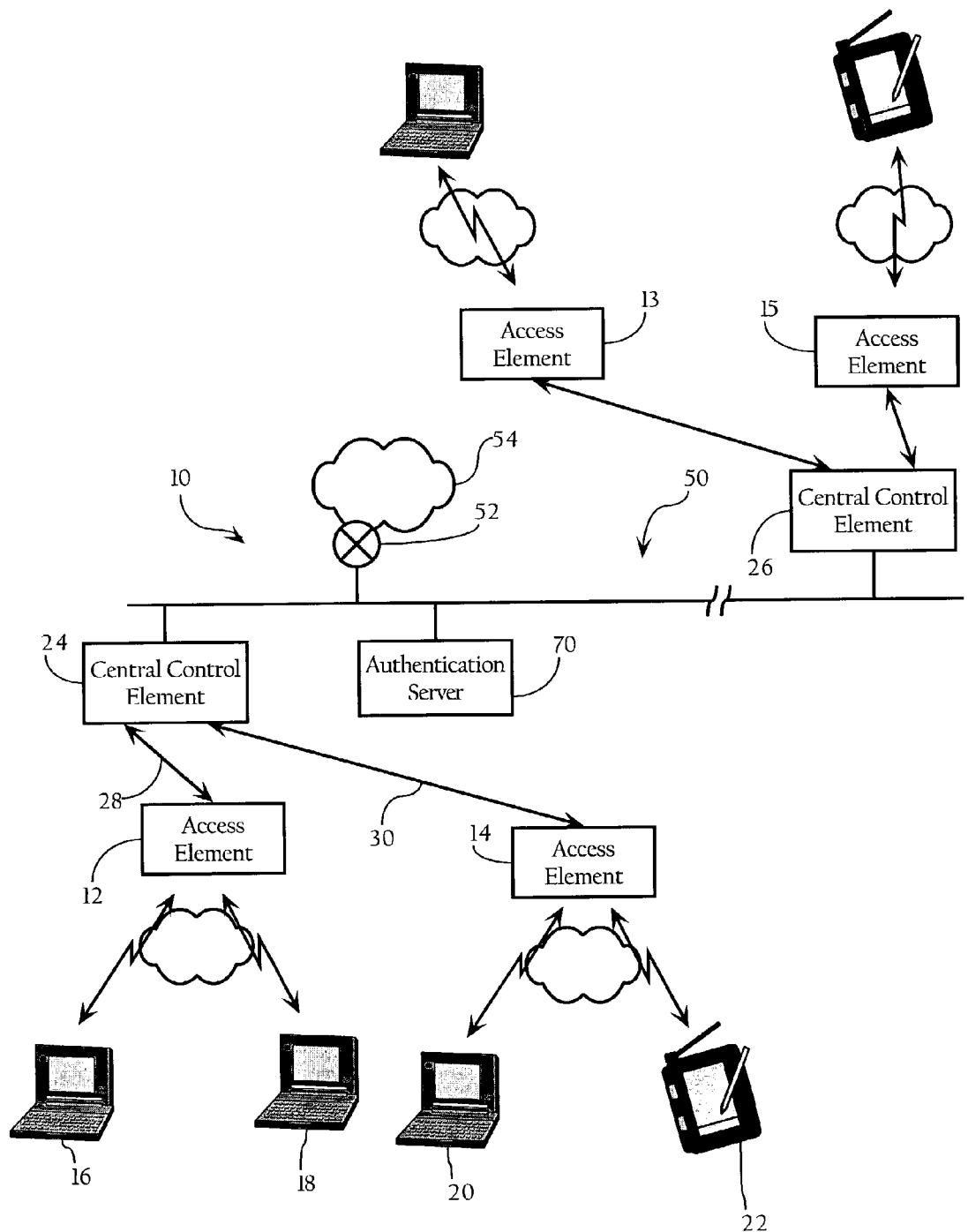
FIG. 1 is a functional block diagram setting forth a wireless network environment according to an embodiment of the present invention.

FIG. 1 illustrates a wireless computer network environment according to an embodiment of the present invention. Referring to FIG. 1, there is shown block diagram of a wireless Local Area Network system 10 according to an embodiment of the invention. A specific embodiment of the invention includes the following elements: access elements 12, 14 for wireless communication with selected client remote elements 16, 18, 20, 22, central control elements 24, 26, and means for communication between the access elements and the central control elements, typically direct line access 28, 30, but potentially a wireless backbone, fiber or other reliable link. In another embodiment, access elements 12, 14 are directly connected to LAN 10 or a virtual local area network (VLAN) for communication with central control element 24.

The access elements 12-15 are coupled via communication means using a wireless local area network (WLAN) protocol (e.g., IEEE 802.11a or 802.11b, etc.) to the client remote elements 16, 18, 20, 22. The communications means 28, 30 between the access elements 12, 14 and the central control element 24 is typically an Ethernet network, but it could be anything else which is appropriate to the environment. As described in U.S. application Ser. No. 10/155,938, the access elements 12, 14 and the central control element 24 tunnel network traffic associated with corresponding remote client elements 16, 18; 20, 22 via direct access lines 28 and 30, respectively. Central control element 24 is also operative to bridge the network traffic between the remote client elements 16, 18; 20, 22 transmitted through the tunnel with corresponding access elements 12, 14.

As described in the above-identified patent application, central control element 24 operates to perform link layer management functions, such as authentication and association on behalf of access elements 12, 14. For example, the central control element 24 provides processing to dynamically configure a wireless Local Area Network of a system according to the invention while the access elements 12, 14 provide the acknowledgment of communications with the client remote elements 16, 18, 20, 22. The central control element 24 may for example process the wireless LAN management messages passed on from the client remote elements 16, 18; 20, 22 via the access elements 12, 14, such as authentication requests and authorization requests, whereas the access elements 12, 14 provide immediate acknowledgment of the communication of those messages without conventional processing thereof. Similarly, the central control element 24 may for example process physical layer information. Still further, the central control element 24 may for example process information collected at the access elements 12, 14 on channel characteristic, propagation, and interference or noise. Central control element 26 and associated access elements 13, 15 operate in a similar or identical manner.

Authentication server 70 performs application-level authentication protocols, typically involving challenge-response queries involving, for example, a user name and password. Authentication server 70 can implement any suitable authentication mechanism, such as IEEE 802.1X, RADIUS, Kerberos, and web-based authentication protocols. In one embodiment, the functionality of authentication server 70 can be integrated into a Virtual Private Network (VPN) server.

As discussed more fully below, the wireless network security scheme according to the present invention employs a mobile station data structure including information characterizing a given remote client element, and a so-called black list defining the remote client elements that should not be provided network access. In one embodiment, the mobile station data structure includes a wireless client identifier (typically, the MAC address of the remote client element), a black list flag (in one embodiment, a "0" indicates that the associated client is not "black-listed," while a "1" indicates that the client is black-listed). In another embodiment, the mobile station data structure may further includes a black list time stamp which, as described below, can be used to place remote client elements on a black list on a temporary basis. The mobile station data structure may also include a field maintaining a count of the number of unsuccessful authentication or association attempts. In one embodiment, central control elements 24, 26 maintain the mobile station data structures and, as discussed below, share mobile station data structures to effect an enterprise-wide security scheme. The mobile station data structures can be implemented as entries in a mobile station table maintained by the central control elements. In another embodiments, the mobile station data structures may be implemented as software objects.

Figure 2:
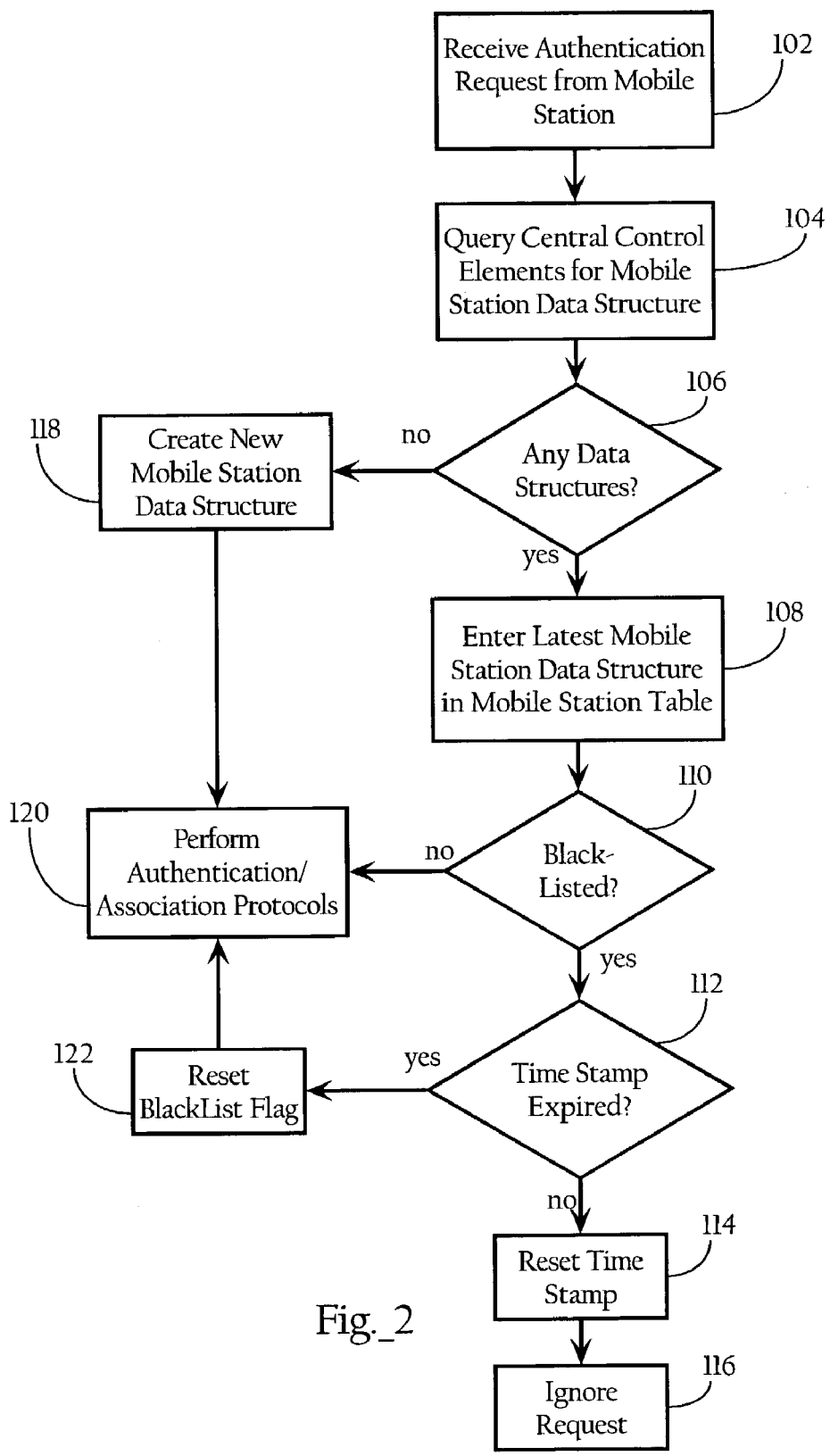
FIG. 2 is a flow chart illustrating a method directed to implementing a security policy at a given access element.

FIG. 2 illustrates a method directed to a security scheme that involves a blacklist operative to determine whether a remote client element may gain network access. FIG. 4 is a block diagram illustrating operation of the security scheme according to an embodiment of the present invention. In 802.11 wireless network environments, for example, a remote client element 16 may issue a probe request to which access elements 12 and/or 14 respond. Using the information in the probe response, remote client element 16 transmits an 802.11 authentication request (FIG. 4, #1). As discussed above, in one embodiment, access element 12 tunnels the authentication request to central control element 24. As FIG. 2 illustrates, when central control element 24 receives the authentication request (102), it queries all known central control elements (e.g., central control element 26), passing the MAC address of the remote client element 16, for mobile station data structures associated with the remote client element. In one embodiment, the central control elements are operative to respond to the request by scanning their respective mobile station tables, and transmitting a message including the mobile station data structure or an indication that no information exists as to the identified remote client element 16. Central control element 24, scanning its own mobile station table and receiving the responses from the queried central control elements, determines whether a mobile station data structure exists for the remote client element (106). If no mobile station data structure is found, central control element 24 creates a new mobile station data structure for remote client element 16, using its MAC address and setting the black list flag to "0" and the time stamp to the current time (118). Otherwise, central control element 24 identifies the latest mobile station data structure by comparing time stamps (if two or more versions exist), and enters the latest data structure into its mobile station table (108). Central control element 24 then looks at the value of the BlackList flag (110) to determine whether remote client element 16 should be allowed to attempt to establish access to the network. As FIG. 2 provides, if the BlackList flag is set to "1", central control element 24 determines whether the time stamp associated with the mobile station data structure has expired (112). In one embodiment, if the time stamp value plus a configurable period of time is less (earlier) than the current time, then the time stamp is deemed expired. If the time stamp has expired, central control element 24 resets the BlackList flag to "0" and sets the time stamp to the current time (122). If the time stamp has not expired, central control element 24, in one embodiment, resets the time stamp to the current time (114)

and ignores the authentication request (116), preventing the remote client element 16 from associating with access element 12 and gaining access to the network.

Figure 3:
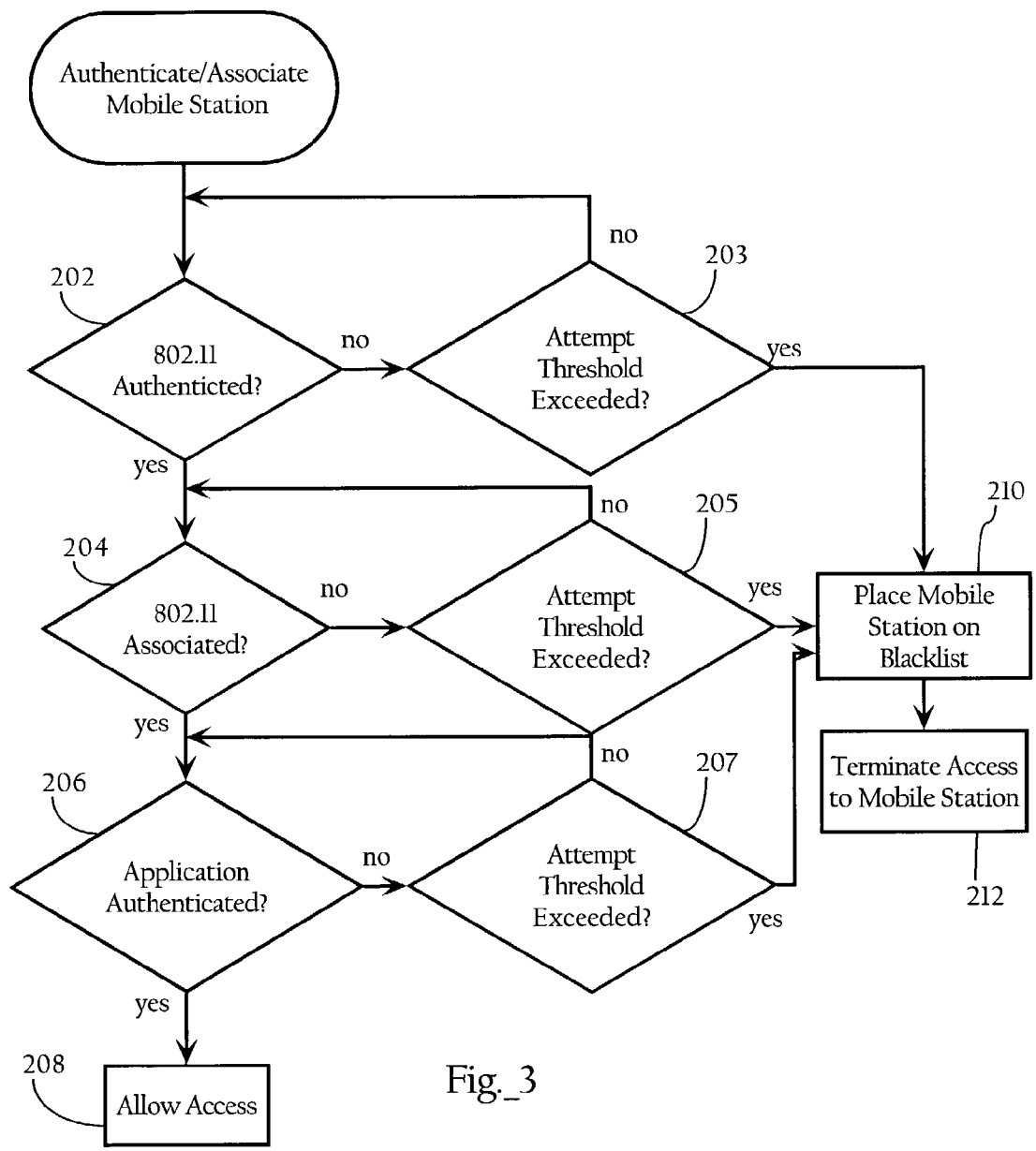
FIG. 3 is a flow chart providing a method associated with authenticating and associating users and setting policies for users based on authentication and/or association failures.

Otherwise, assuming the remote client element 16 has not been black-listed, authentication and association protocols are performed (120), as set forth in FIG. 3. As FIG. 3 illustrates, the wireless network environment, in one embodiment, includes link layer authentication/association protocols (implemented by central control element 24 via an access element), and an application level authentication mechanism (implemented by authentication server 70). The present invention, however, can be applied using a variety of authentication and/or association schemes. In addition, as one skilled in the art will recognize, the link layer authentication and association protocols employed will depend on the wireless network protocols employed. In embodiments implementing the 802.11 protocol, central control element 24 performs an authentication of remote client element according to the 802.11 protocol (202). In one embodiment, central control element 24 through a corresponding access element implements a shared-key authentication scheme. As FIG. 3 illustrates, central control element 24 allows a threshold number of failed authentication attempts (203) before placing remote client element 16 on the black list (210) and terminating access (212). Similarly, central control element 24 allows a threshold number of failed association attempts (204, 205) before placing the remote client element 16 on the black list. Assuming remote client element 16 successfully authenticates and associates to an access element, central control element 24 directs remote client element 16 to authentication server 70 (206). As above, remote client element 16 is allowed a threshold number of authentication attempts (207), before being placed on the black list.

In one embodiment, the attempt threshold is a configurable parameter, which can be applied individually to each security layer or on an aggregate basis to all failed attempts in the authentication and association protocol implemented by the wireless network infrastructure. Moreover, as discussed above, the mobile station data structure may further include a field maintaining a count of the number of failed authentication attempts to prevent against an attack where the wireless client moves to a coverage area associated with another access point/central control element before exceeding the attempt threshold and being placed on a black list. In such an embodiment, the attempts field could be reinitialized when the wireless client successfully passes the security scheme implemented by the network environment. In addition, the time stamp value could be updated with each failed attempt to allow for time-based decisions to reset the counts after a threshold period of time after the last attempt.

FIG. 4 demonstrates the security scheme effected by the embodiment discussed above. For example, a remote client element 16 in the coverage area associated with access element 12 is placed on a black list after failing to authenticate (FIG. 4, #1). The user then moves remote client element 16 to the coverage area associated with access element 14 (#2). Access element 14, under the management of central control element 24, denies access to remote client element 16 (in one embodiment, by ignoring authentication or association requests), as long as the remote client element remains on the black list. The user then moves to a coverage area associated with access element 13 under the management of central control element 26 (#3). Given that the central control elements exchange mobile station data structures, remote client element 16 is again denied access to the network.

In addition, beyond the sharing of security policy information across access elements in a wireless network environment, the present invention achieves an enhanced network security system by allowing information gleaned from security policies at one level (e.g., application layer security) to be used in setting security policies at a different level or layer. For example, assume for didactic purposes that a remote client element properly authenticates and associates at the 802.11 or other link layer, but fails to properly authenticate at the application layer with authentication server 70, for example. After a threshold number of attempts, the remote client element is "black-listed." As one will recognize, the security state associated with the remote client element 16 extends to other security mechanism at lower layers. In the embodiment described herein, for example, the remote client element would be prevented from authenticating or associating with an access element at the link layer during a subsequent attempt to establish a connection. As one skilled in the art, this aspect of the invention has application to wired networks as well. For example, in a LAN including DHCP functionality and an authentication server, the DHCP server associated with the LAN can maintain a blacklist (identifying clients by MAC address) and deny requests for dynamic IP addresses based on the state of the black list. In one embodiment, the DHCP server can implement the blacklist by reserving an inoperative (e.g., non-routable, or the loop back address) IP address for the particular black-listed client(s). The DHCP server can release a client-from the black list by normal termination of the DHCP address lease. In another embodiment, a client node is placed on the black list after a threshold number of failed attempts to authenticate with the authentication server.

A variety of embodiments are possible. For example, the central control elements can be configured to publish or push updates to mobile station data structures (e.g., changes in security state information) to other known central control elements. In addition, the central control elements can be manually configured with the computer network address of neighboring central control elements to allow for exchange of mobile station data structures. In other embodiments, the central control elements may include various layer 2 or layer 3 discovery mechanisms to automatically configure the exchange of mobile station data structures. In addition, the present invention can be applied to a variety of other wireless network architectures. For example, the wireless network infrastructure need not include central control elements. For example, the mobile station tables and associated security and link layer management functionality performed by the central control elements may be integrated into the access elements to operate in a substantially autonomous mode (obviating the use of the central control elements). In addition, a central management appliance can be introduced to manage and coordinate the exchange of mobile station data structures among the wireless access points.

Accordingly, the invention has been explained with reference to specific embodiments. Other embodiments will be evident to those of ordinary skill in the art. It is, therefore, intended that the claims set forth below not be limited to the embodiments described above.

What is claimed is:

1. In a wireless network environment comprising a plurality of access elements for wireless communication with at least one remote client element, a method enabling an enhanced wireless network security system, comprising maintaining security states for remote client elements detected by the access elements, applying a security mechanism to control access to wireless connections to remote client elements, wherein operation of the security mechanism is based on the security states of the remote client elements, adjusting the security state associated with a remote client element based on its interaction with the security mechanism, and exchanging with other access elements security states associated with remote client elements.

2. A central control element for supervising a plurality of access elements, comprising
a processor operative to
manage wireless connections between access elements and corresponding remote client elements,
maintain security states for remote client elements detected by access elements,
apply, at access elements, a first security mechanism to control access to the wireless connections to remote client elements, wherein operation of the security mechanism is based on the security states of the remote client elements, wherein a remote client element for which there is no security state information is initially allowed access to interact with a second security mechanism; and
adjust the security state associated with the remote client element based on its interaction with the second security mechanism.

3. A wireless network security system, comprising
a plurality of access elements for wireless communication with at least one remote client element and for communication with a central control element;
a central control element for supervising said access elements, wherein the central control element is operative to manage wireless connections between the access elements and corresponding remote client elements,
wherein the central, control element is operative to
maintain security states for remote client elements detected by the access elements,
apply, at the access elements, a first security mechanism to control access to the wireless connections to remote client elements, wherein operation of the security mechanism is based on the security states of the remote client elements, wherein a remote client element for which there is no security state information is initially allowed access to interact with a second security mechanism; and
adjust the security state associated with the remote client element based on its interaction with the second security mechanism.

4. The system of claim 3 wherein the first security mechanism is a link layer security mechanism; and wherein the second security mechanism is an application layer security mechanism.

5. The system of claim 4 wherein the application-level security mechanism is an authentication server.

6. The system of claim 5 wherein the authentication server is a RADIUS server.

7. The system of claim 3 wherein security states are stored in mobile station data structures, each comprising a wireless client identifier and a black list flag.

8. The system of claim 7 wherein each mobile station data structure further comprises a time stamp.

9. The system of claim 8 wherein the central control element comprises a mobile station table, and wherein the mobile station data structures are entries in the mobile station table.

10. The system of claim 8 wherein the mobile station data structure is a software object.

11. The system of claim 7 wherein the wireless client identifier is a MAC address.

12. The system of claim 7 wherein the wireless client identifier is an application-layer credential.

13. The system of claim 12 wherein the application-layer credential is a user name.

14. The system of claim 7 wherein the central control element is operative to:
set the black list flag associated with a remote client element if the remote client element fails the first security mechanism beyond a threshold number of times.

15. The system of claim 14 wherein the central control element is operative to deny access to wireless connections with a corresponding access element to remote client elements associated with a set black list flag.

16. The system of claim 3 further comprising
a second plurality of access elements for wireless communication with at least one remote client element and for communication with a central control element;
a second central control element for supervising said second plurality of access elements, wherein the second central control element is operative to manage wireless connections between the access elements and corresponding remote client elements,
wherein the second central control element is operative to
maintain security states for remote client elements detected by the access elements,
apply, at the access elements, a first security mechanism to control access to the wireless connections to remote client elements, wherein operation of the security mechanism is based on the security states of the remote client elements, wherein a remote client element for which there is no security state information is initially allowed access to interact with a second security mechanism; and
adjust the security state associated with the remote client element based on its interaction with the second security mechanism; and
wherein the first and second central control elements are operative to exchange security states associated with remote client elements.

17. The system of claim 16 wherein each central control element is operative to query other central control elements for the security state associated with a remote client element, in response to an access request transmitted by the remote client element.

18. In a wireless network environment comprising a plurality of access elements for wireless communication with at least one remote client element, the wireless network environment maintaining security states for remote client elements detected by the access elements, a method enabling an enhanced wireless network security system, comprising
receiving, at a wireless access element, a link layer authentication request from a remote client element;
querying one or more elements of a wireless network environment for a security state associated with the remote client element;
conditionally responding to the link layer authentication request with an authentication challenge, wherein the responding to the link layer authentication request is conditioned on the security state associated with the remote client element;

adjusting the security state based on the interaction between the wireless access element and the remote client element.

19. The method of claim 18 wherein the adjusting step comprises
adjusting the security state of the remote client element, if the remote client element fails the authentication challenge a threshold number of times.

20. The method of claim 19 wherein the security state includes a time stamp, and wherein the time stamp is set to the current time during the adjusting step.

21. The method of claim 20 further comprising resetting the time stamp to the current time if the remote client attempts to authenticate after failing the authentication challenge a threshold number of times.

22. The method of claim 20 further comprising resetting the security state of the remote client element upon expiration of the time stamp.

23. The method of claim 18 wherein the security state includes a time stamp.

24. A wireless network security system, comprising
a wireless network infrastructure comprising a plurality of access elements for wireless communication with at least one remote client element,
wherein each access element is operative to
maintain security states for remote client elements detected by the access elements,
apply a security mechanism to control access to the wireless connections to remote client elements, wherein operation of the security mechanism is based on the security states of the remote client elements,
adjust the security state associated with a remote client element based on its interaction with the security mechanism, and
exchange with other access elements security states associated with remote client elements.

25. The system of claim 24 wherein the security mechanism is a link layer security mechanism; and wherein the system further comprises
a second security mechanism operating in connection with the access elements to control access to wireless connections with the access elements,
wherein the access elements are operative to:
adjust the security state associated with a remote client element based on its interaction with the second security mechanism.

26. The system of claim 25 wherein the second security mechanism is an application-level security mechanism.

27. The system of claim 26 wherein the application-level security mechanism is an authentication server.

28. The system of claim 27 wherein the authentication server is a RADIUS server.

29. The system of claim 24 wherein security states are stored in mobile station data structures, each comprising a wireless client identifier and a black list flag.

30. The system of claim 29 wherein each mobile station data structure further comprises a time stamp.

31. The system of claim 29 wherein the wireless client identifier is a MAC address.

32. The system of claim 31 wherein each access element comprises a mobile station table, and wherein the mobile station data structures are entries in the mobile Station table.

33. The system of claim 31 wherein the mobile station data structure is a software object.

34. The system of claim 29 wherein the wireless client identifier is an application-layer credential.

35. The system of claim 34 wherein the application-layer credential is a user name.

36. The system of claim 24 wherein each access element is operative to query the other access elements for the security state associated with a remote client element.

37. In a network environment including a plurality of security mechanisms operating at different layers with the network environment, a method enhancing the security of network environments, comprising
detecting an attempt by a network access device to access a computer network;
applying a first security mechanism operative to control access to the computer network, wherein the first security mechanism operates at a first network layer to a network access device, and wherein the applying step comprises authenticating the user associated with the network access device, comprising: maintaining an authentication count, transmitting an authentication challenge to the network access device, receiving an authentication response from the network access device, validating the authentication response; if the authentication count is below a threshold count and the response is not valid, repeating the authentication step; if the authentication count exceeds the threshold count and the response is not valid, then configuring the second security mechanism to deny access to the network access device; and
configuring a policy for a second security mechanism operating at a second network layer based on information obtained from the applying step; wherein the first security mechanism is an application-level security mechanism, and wherein the second security mechanism is a link layer security mechanism.

38. The method of claim 37 wherein the application-level security mechanism is an authentication server.

39. The method of claim 38 wherein the authentication server is a RADIUS server.

* * * * *